United States Patent [19]

Boudot et al.

[11] Patent Number: 4,565,791
[45] Date of Patent: Jan. 21, 1986

[54] GLASSES FOR OPHTHALMIC APPLICATIONS

[75] Inventors: Jean E. Boudot; Jean P. Mazeau, both of Avon, France

[73] Assignee: Corning Glass Works, Corning, N.Y.

[21] Appl. No.: 630,094

[22] Filed: Jul. 12, 1984

[30] Foreign Application Priority Data

Jan. 13, 1984 [FR] France ................. 84 00481

[51] Int. Cl.⁴ .......... C03C 3/11; C03C 3/091; C03C 3/093; C03C 4/00
[52] U.S. Cl. .................. 501/56; 501/66; 501/67; 501/903
[58] Field of Search .......... 501/56, 65, 66, 67, 501/903

[56] References Cited

U.S. PATENT DOCUMENTS 3,951,671 4/1976 Parry et al. .............. 501/903
3,998,647 12/1976 Yamashita et al. ........ 501/903
4,001,019 1/1977 Yamashita et al. ........ 501/903
4,367,012 1/1983 Ikeda et al. ............. 501/903

*Primary Examiner*—Mark L. Bell
*Attorney, Agent, or Firm*—C. S. Janes, Jr.

[57] ABSTRACT

This invention is concerned with the production of glasses suitable for ophthalmic applications having refractive indices of 1.523±0.004, Abbe number between 51-59, densities less than 2.43 g/cm³, transmissions at 400 nm in 2 mm thickness greater than 89%, and a UV cutoff between 310-335 nm, said glasses consisting essentially, in weight percent on the oxide basis, of:

| | | | |
|---|---|---|---|
| $SiO_2$ | 49-71 | $Li_2O + Na_2O + K_2O$ | 8-20 |
| $B_2O_3$ | 5-26 | $TiO_2$ | 1.8-6 |
| $Al_2O_3$ | 0-14 | $ZrO_2$ | 0-5.5 |
| $Li_2O$ | 0-4 | $As_2O_3$ and/or $Sb_2O_3$ | 0-0.7 |
| $Na_2O$ | 0-16 | Cl and/or Br | 0-1 |
| $K_2O$ | 0-20 | CaO and/or MgO and/or ZnO and/or BaO | 0-4 |

4 Claims, No Drawings

GLASSES FOR OPHTHALMIC APPLICATIONS

BACKGROUND OF THE INVENTION

The present invention relates to glasses for ophthalmic applications which, in addition to the properties of ultraviolet radiation (UV) absorption and high transmission in the visible (absence of coloration), have a low density, as well as corrective lenses produced from these glasses.

These glasses are characterized by an index of refraction ($n_d$) of 1.523±0.004, an Abbe number ($V_d$) between 51-59, and a density (D) less than 2.43 g/cm$^3$. Their transmission at 400 nm is, for a thickness of 2 mm, greater than 89%. Their UV cutoff, defined as the wavelength for which the transmission is equal to 1% for a thickness of 2 mm, is between 310-335 nm. Moreover, they exhibit excellent chemical durability (A.O. test).

Lenses of inorganic glass ("white" or tinted) for ophthalmic use have, to a very great extent, an index of refraction $n_d = 1.523$. The "white" (or tinted) glasses used at the present time and which exhibit in certan cases a UV cutoff higher than 300 nm, have a density at least equal to 2.54 g/cm$^3$. A reduction of the density and, consequently, of the weight of the lens, offers an obvious advantage for the wearer and that regardless of the power of the lens. The lightening of the lens by the glasses of this invention is about 6.5-7%.

SUMMARY OF THE INVENTION

The glasses of the invention belong to the base system $SiO_2$—$B_2O_3$—$TiO_2$—$R_2O$ (R=Li,Na, K) and are prepared from a batch composition consisting essentially, in weight percent on the oxide basis:

| | | | |
|---|---|---|---|
| $SiO_2$ | 49-71 | $Li_2O + Na_2O + K_2O$ | 8-20 |
| $B_2O_3$ | 5-26 | $TiO_2$ | 1.8-6 |
| $Al_2O_3$ | 0-14 | $ZrO_2$ | 0-5.5 |
| $Li_2O$ | 0-4 | $As_2O_3$ and/or $Sb_2O_3$ | 0-0.7 |
| $Na_2O$ | 0-16 | Cl and/or Br | 0-1 |
| $K_2O$ | 0-20 | CaO and/or MgO and/or ZnO and/or BaO | 0-4 |

The content of $SiO_2$ lies between about 49-71% approximately and results from the choice of the other glass components whose content limitations are described below.

$B_2O_3$ is an essential element of the glass because it especially makes it possible to obtain a low density; when $B_2O_3$ increases, the density of the glass decreases, the UV cutoff rises and the viscosity of the glass at high temperature decreases, which facilitates its melting and forming. To eliminate $B_2O_3$ from the glass would lead, on the one hand, to a density situated at the higher admissible limit, and, on the other hand, to higher melting and forming temperatures. Therefore, the glass will contain at least 5%. Above 26%, the $SiO_2$ content would have to be greatly reduced, thereby reducing the chemical resistance of the glass and the transmission.

The presence of $Al_2O_3$ is not indispensable; nevertheless, the most preferred glasses will contain some. As a matter of fact, besides improving the chemical resistance, $Al_2O_3$ substituted for $SiO_2$ reduces the density and, more significantly, increases the UV cutoff. Above about 14%, the solubility of $TiO_2$ in the glass is greatly diminished and, in a high content, it precipitates during the course of cooling. If one seeks to obtain glasses having a UV cutoff higher or equal to 325 nm, it is indispensable that the $Al_2O_3$ content be greater than 2-3%, if $B_2O_3$ is less than about 14%.

$TiO_2$ is the determining element for the UV cutoff. Therefore, a minimum amount of 1.8% is necessary to obtain a UV cutoff on the order of 310 nm. To obtain 325 nm, $TiO_2$ should be greater than approximately 4%. with the previously-stated condition with respect to $Al_2O_3$ and $B_2O_3$. Above 6% $TiO_2$, the tendency to opacify during the course of cooling is increased and that particularly in the glasses containing a low content of alkali metal oxides (the latter is necessary in order not to exceed the desired index value). Besides its indispensable presence for UV absorption, $TiO_2$ contributes to the refractive index. Depending upon the content thereof, the index is adjusted with the alkali metal oxides, the concentration of $ZrO_2$, and/or of the alkaline earth metal oxides and/or ZnO.

$ZrO_2$ is preferred over MgO, CaO, BaO, or ZnO for adjusting the index when the alkali metal oxides do not suffice.

With respect to the alkali metal oxides, the sum $Li_2O + Na_2O + K_2O$ will range between about 8-20%. Below 8%, the viscosity of the glass is high and the transmission decreases. On the other hand, the solubility of $TiO_2$ in the glass decreases which promotes opacification. To avoid phase separation of the matrix, the presence of $Al_2O_3$ is recommended when the content of alkali metals is close to the minimum level. The maximum concentration of alkali metal oxides is determined principally by the density, the refractive index, and the chemical durability. The proportion of the alkali metal oxides is adjusted as a function of the amount of $TiO_2$, $B_2O_3$, and $Al_2O_3$ in order to obtain the best compromise of properties—facility of melting and forming. If utilized alone, $Na_2O$ and $K_2O$ will be limited to about 16% and 20%, respectively. $Li_2O$ wil not exceed 4% because the tendency of the glass to opalize increases (linked to the insolubility of $TiO_2$). In particular, when $TiO_2$ is greater than 4% in the presence of average amounts of $Al_2O_3$ and $B_2O_3$, the concentration of $Li_2O$ will be maintained below 3%. Based upon weight percentages and in substitution with regard to $SiO_2$, the contribution to the index and to the density increases in the following order: $K_2O$, $Na_2O$, $Li_2O$. In general, the UV cutoff diminishes when the quantity of alkali metal oxides increases. Therefore, to obtain a high cutoff (>325 nm), the total content will preferably be less than about 15%.

When $TiO_2$ is greater than 3-3.5%, the glass is found to be more sensitive to the melting conditions in the sense that a coloration ("rose-orange") unacceptable to a glass called "white" can be observed in certain cases. This is probably linked to the presence of $Ti^{+3}$ ions; reducing melting conditions will be avoided. To improve the stability with respect to variations in melting conditions or batch materials, and in order to obtain a "white" glass regardless of the $TiO_2$ content and particularly at 5% $TiO_2$, which leads to a high UV cutoff, $As_2O_3$ and/or $Sb_2O_3$ will be added. A maximum quantity of 0.7% will be employed. $As_2O_3$ is preferred to $Sb_2O_3$.

$As_2O_3$ and $Sb_2O_3$ contribute equally to the fining of the glass. In certain cases, those fining agents are not sufficient and chlorine (with or without bromine) will be introduced into the batch materials in the form of chlorine (bromine) compounds such as chloride (bromide) of sodium or potassium. In view of the volatilization during the melting process, only a fraction of the batched quantity will be present in the final glass.

PRIOR ART

U.S. Pat. No. 2,454,607 discloses glasses designed for sealing to a nickel-iron alloy, the glasses having compositions consisting, in weight percent on the oxide basis, of

| $B_2O_3$ | 20–24 | $Na_2O$ | $\geq 2$ |
|---|---|---|---|
| $Al_2O_3$ | 3–6 | $K_2O$ | $\geq 2$ |
| $TiO_2$ | 2–5 | $Li_2O$ | 7–12 |
| $ZrO_2$ | 0.5–1.5 | $SiO_2$ | 56–68 |

No mention is made of ophthalmic applications, of a high UV cutoff, or of a colorless glass. Moreover, the $Li_2O$ content is much higher than can be tolerated in the subject invention.

U.S. Pat. No. 4,224,074 described glass frits suitable for decorating glass, glass-ceramic, and ceramic articles, the frits consisting essentially, in weight percent on the oxide basis, of

| $SiO_2$ | 29–55 | $Na_2O$ | 4–20 |
|---|---|---|---|
| $B_2O_3$ | 7–31 | $Li_2O$ | 0–7 |
| $Al_2O_3$ | 2–8 | $Na_2O + Li_2O$ | 6–24 |
| $ZrO_2$ | 5–16 | F | 0.75–4 |

No mention is made of ophthalmic applications, of a high UV cutoff, or of a colorless glass. Moreover, fluoride is a required component, which element forms no part of the subject invention, and $TiO_2$ is merely an optional ingredient.

DESCRIPTION OF PREFERRED EMBODIMENTS

The invention is illustrated through the examples provided in the attached table. The compositions are given in batched weight percentages. The batch materials utilized (and notably the source of $SiO_2$) must be carefully selected in order to obtain a minimum amount of $Fe_2O_3$. As a matter of fact, $Fe_2O_3$ in too large a quantity (greater than about 100 PPM in the glass) leads to a yellow coloration. This coloration results from the known interaction between $Fe_2O_3$ and $TiO_2$. Particularly for $SiO_2$, one utilizes quartz wherein the $Fe_2O_3$ content is on the average less than 10 PPM. The other principal batch materials that can be utilized are boric acid [$B(OH)_3$], boric anhydride, the carbonates of $Li_2O$, $Na_2O$, and $K_2O$, titanium oxide, zirconium oxide, or zircon.

In the presence or not of $As_2O_3$, at least 2% $Na_2O$ or $K_2O$ will be introduced in the form of nitrates in order to obtain oxidizing conditions during melting of the mixture of batch materials.

The examples of the invention were prepared from mixtures representing 100 grams to several kilograms of glass. Melting of the batch materials took place at 1250°–1350° C. following which the temperature was raised to 1400°–1460° C. for homogenizing and fining the glass. Pouring took place after cooling to a temperature allowing either the forming of a bar or the pressing of a disc. The corresponding viscosity ranged between 100–1000 poises. The total time of the operation was on the order of 3–7 hours. After forming, the glass was annealed at about 480° C. with a cooling rate to ambient temperature of 60° C./hour; the properties were then determined.

Measurements of refractive index and Abbe number were carried out according to conventional methods (for $n_d$ the yellow ray of He was used) on glasses having been cooled from 480° C. to ambient temperature at the rate of 60° C./hour. Density was measured by the immersion method and expressed in $g/cm^3$.

The chemical resistance in acid medium was evaluated by the A.O. test described in the journal *Appied Optics*, 7, No. 5, page 847, May, 1968. It consists of determining the loss of weight of a polished sample immersed at 25° C. for 10 minutes in a 10% by weight aqueous solution of HCl. The loss of weght is expressed in $mg/cm^2$.

The transmission curve was recorded at a thickness of 2 mm with the aid of a Hewlett-Packard spectrophotometer (type 845A).

The glasses of the invention can be tinted for an ophthalmic application by using conventional colorants: transition metal oxides or rare earth oxides or other known colorant elements. The total content of these colorants will not generally exceed 2%.

The glasses of the invention can be strengthened according to current techniques of thermal or chemical tempering. In the latter case, the strengthening requires the replacement of a $Na^{30}$ and/or $Li^+$ ion in the glass by $Na^+$ and $K^+$ ions in a bath of molten nitrates, which imnplies that the glass does not contain $K_2O$ as the only alkali metal oxide.

Preferably, and in order to obtain a UV cutoff higher than about 325 nm, the glasses will be prepared from a batch composition consisting essentially, in weight percent on the oxide basis:

| $SiO_2$ | 54–70 | $Li_2O + Na_2O + K_2O$ | 10–13 |
|---|---|---|---|
| $B_2O_3$ | 9–22 | $TiO_2$ | 4–6 |
| $Al_2O_3$ | 3–10 | $ZrO_2$ | 0–2 |
| $Li_2O$ | 0.5–3 | $As_2O_3$ | 0.10–0.50 |
| $Na_2O$ | 3–9 | Cl | 0.2–0.7 |
| $K_2O$ | 3–10 | | |

As previously described, the $TiO_2$ content must be adjusted as a function of the $Al_2O_3$, $B_2O_3$, and alkali metal oxide contents in order to obtain a UV cutoff greater or equal to 325 nm (see table of examples). For example, a low content of $Al_2O_3$ and $B_2O_3$ must be associated with a high concentration of $TiO_2$.

The particularly preferred glasses, because of their excellent properties and their facility for melting and forming on an industrial scale, are prepared from a batch composition consisting essentially, in weight percent on the oxide basis:

| $SiO_2$ | 56–62 | $Li_2O + Na_2O + K_2O$ | 10.5–12.5 |
|---|---|---|---|
| $B_2O_3$ | 15–20 | $TiO_2$ | 4.2–5.5 |
| $Al_2O_3$ | 4–7.5 | $ZrO_2$ | 0–1.5 |
| $Li_2O$ | 1–2.5 | $As_2O_3$ | 0.10–0.50 |
| $Na_2O$ | 3–7 | Cl | 0.2–0.7 |
| $K_2O$ | 3–6 | | |

The most especially preferred glass is that of Example 1. This glass has a low density (2.37 $g/cm^3$), a high UV cutoff (330 nm), and exhibits no coloration in the visible. Furthermore, it has excellent chemical durability (loss of weight in the A.O. test=0.004 $mg/cm^2$) and can be easily produced in a continuous melting unit. It can also be formed at a viscosity of 3000–6000 poises with no problem of devitrification.

TABLE

|   | 1 | 2 | 3 | 4 | 5 | 6 | 7 | 8 | 9 | 10 | 11 |
|---|---|---|---|---|---|---|---|---|---|---|---|
| $SiO_2$ | 58.89 | 55.91 | 69.21 | 69.21 | 59.26 | 65.69 | 58.89 | 63.58 | 58.9 | 58.91 | 56.33 |
| $B_2O_3$ | 17.28 | 20.26 | 9.94 | 6.96 | 22.38 | 15.12 | 13.53 | 14.1 | 15.29 | 17.87 | 18.15 |
| $Al_2O_3$ | 6.19 | 6.19 | 3.21 | 6.19 | 1.23 | 2.21 | 9.94 | 3.2 | 6.19 | 6.19 | 6.19 |
| $Li_2O$ | 1.8 | 2.4 | 1.8 | 1.8 | 1.81 | 1.79 | 2.4 | — | 2.79 | 1.8 | 1.8 |
| $Na_2O$ | 4.09 | 4.09 | 4.09 | 4.09 | 6.11 | 4.07 | 4.09 | 6.05 | 3.09 | 9.89 | 4.09 |
| $K_2O$ | 5.81 | 5.81 | 5.81 | 5.81 | 3.84 | 5.79 | 5.81 | 5.78 | 8.79 | — | 5.81 |
| MgO | | | | | | | | — | — | — | — |
| CaO | | | | | | | | — | — | — | — |
| ZnO | | | | | | | | 1.98 | — | — | — |
| $ZrO_2$ | | | | | | | | — | — | — | 4.99 |
| $TiO_2$ | 5.07 | 4.47 | 5.07 | 5.07 | 4.5 | 4.46 | 4.47 | 4.45 | 4.08 | 4.47 | 2.07 |
| Cl | 0.57 | 0.57 | 0.57 | 0.57 | 0.57 | 0.57 | 0.57 | 0.56 | 0.57 | 0.57 | 0.57 |
| $As_2O_3$ | 0.3 | 0.3 | 0.3 | 0.3 | 0.3 | 0.3 | 0.3 | 0.3 | 0.3 | 0.3 | — |
| $n_d$ | 1.5231 | 1.5213 | 1.5255 | 1.5231 | 1.5259 | 1.5226 | 1.5227 | 1.5191 | 1.5269 | 1.5266 | 1.5205 |
| $V_d$ | 53 | 54.7 | 54.1 | 53.7 | 55 | 55.3 | 53.94 | 54.6 | 55.3 | 54.1 | 57.1 |
| D | 2.37 | 2.36 | 2.41 | 2.40 | 2.42 | 2.39 | 2.38 | 2.40 | 2.41 | 2.40 | 2.39 |
| % Trans. 400 nm | 90.1 | 89.7 | 90.1 | 90.4 | 89.9 | 90.2 | 90 | 91.2 | 90.6 | 90.7 | 90.7 |
| UV nm Cutoff | 330 | 326 | 325 | 327 | 324 | 323 | 327 | 323 | 322 | 324 | 311 |

|   | 12 | 13 | 14 | 15 | 16 | 17 | 18 | 19 | 20 | 21 |
|---|---|---|---|---|---|---|---|---|---|---|
| $SiO_2$ | 62.13 | 64.35 | 64.35 | 64.35 | 58.89 | 57.43 | 57.19 | 62.89 | 56.68 | 51.08 |
| $B_2O_3$ | 14.35 | 12.27 | 14.27 | 14.27 | 10.55 | 18.15 | 18.07 | 16.16 | 17.87 | 18.18 |
| $Al_2O_3$ | 6.22 | 3.23 | 3.23 | 3.23 | 12.92 | 6.19 | 6.17 | 3.21 | 6.19 | 6.21 |
| $Li_2O$ | 0.81 | 1.81 | 1.81 | 1.81 | 2.4 | 1.8 | 1.79 | 1.8 | — | 0.5 |
| $Na_2O$ | 6.1 | 4.12 | 4.12 | 4.12 | 4.09 | 4.09 | 5.06 | 4.09 | 13.92 | — |
| $K_2O$ | 3.83 | 5.85 | 5.85 | 5.85 | 5.81 | 5.81 | 5.78 | 5.81 | — | 18.68 |
| MgO | — | 4 | — | | | | | | | |
| CaO | — | — | 2 | | | | | | | |
| ZnO | — | — | — | 2 | — | — | — | — | — | — |
| $ZrO_2$ | — | — | — | — | — | 2.98 | 2.97 | 1.99 | — | — |
| $TiO_2$ | 5.69 | 3.5 | 3.5 | 3.5 | 4.47 | 2.98 | 2.97 | 3.48 | 4.47 | 4.48 |
| Cl | 0.57 | 0.57 | 0.57 | 0.57 | 0.57 | 0.57 | — | 0.57 | 0.57 | 0.57 |
| $As_2O_3$ | 0.3 | 0.3 | 0.3 | 0.3 | 0.3 | — | — | — | 0.3 | 0.3 |
| $n_d$ | 1.5212 | 1.5224 | 1.5241 | 1.5200 | 1.5228 | 1.5203 | 1.5250 | 1.5221 | 1.5230 | 1.5195 |
| $V_d$ | 51.8 | 57.2 | 56.4 | 55.8 | 53.7 | 55.8 | 56.8 | 56.5 | 54.1 | 54.3 |
| D | 2.37 | 2.41 | 2.41 | 2.40 | 2.39 | 2.38 | 2.42 | 2.39 | 2.42 | 2.38 |
| % Trans. 400 nm | 89.5 | 89.4 | 91.8 | 90 | 90.5 | 91 | 91.1 | 89.8 | 89.9 | 90.4 |
| UV nm cutoff | 333 | 319 | 320 | 320 | 330 | 317 | 316 | 319 | 323 | 323 |

We claim:

1. A glass for ophthalmic applications having a refractive index of 1.523±0.004, Abbe number between 51–59, a density less than 2.43 g/cm³, a transmission at 400 nm in 2 mm thickness greater than 89%, and a UV cutoff between about 325–335 nm characterized in that it is prepared from a batch composition consisting essentially, in weight percent on the oxide basis, of:

| $SiO_2$ | 54–70 | $Li_2O + Na_2O + K_2O$ | 10–13 |
|---|---|---|---|
| $B_2O_3$ | 9–22 | $TiO_2$ | 4–6 |
| $Al_2O_3$ | 3–10 | $ZrO_2$ | 0–2 |
| $Li_2O$ | 0.5–3 | $As_2O_3$ | 0.10–0.50 |
| $Na_2O$ | 3–9 | Cl | 0.2–0.7 |
| $K_2O$ | 3–10 | | |

2. A glass according to claim 1 characterized in that it is prepared from a batch composition consisting essentially, in weight percent on the oxide basis, of:

| $SiO_2$ | 56–62 | $Li_2O + Na_2O + K_2O$ | 10.5–12.5 |
|---|---|---|---|
| $B_2O_3$ | 15–20 | $TiO_2$ | 4.2–5.5 |
| $Al_2O_3$ | 4–7.5 | $ZrO_2$ | 0–1.5 |
| $Li_2O$ | 1–2.5 | $As_2O_3$ | 0.10–0.50 |
| $Na_2O$ | 3–7 | Cl | 0.2–0.7 |
| $K_2O$ | 3–6 | | |

3. A glass according to claim 2 characterized in that it is prepared from a batch composition consisting essentially, in weight percent on the oxide basis, of:

| $SiO_2$ | 58.89 | $K_2O$ | 5.81 |
|---|---|---|---|
| $B_2O_3$ | 17.28 | $TiO_2$ | 5.07 |
| $Al_2O_3$ | 6.19 | $As_2O_3$ | 0.3 |
| $Li_2O$ | 1.8 | Cl | 0.57 |
| $Na_2O$ | 4.09 | | |

4. A glass according to claim 1 characterized in that it is tinted by up to 2% by weight relative to the weight of the glass of at least one colorant element.

* * * * *